United States Patent [19]

Young

[11] Patent Number: 4,745,348
[45] Date of Patent: May 17, 1988

[54] APPARATUS FOR STARTING AND RUNNING A PLURALITY OF THREE-PHASE MOTORS FROM A SINGLE-PHASE POWER SOURCE

[76] Inventor: William T. Young, Rte. 1, Box 1496, Dawsonville, Ga. 30534

[21] Appl. No.: 910,133

[22] Filed: Sep. 22, 1986

[51] Int. Cl.$^4$ ............................................. H02P 1/44
[52] U.S. Cl. ................................... 318/749; 318/817
[58] Field of Search ................ 318/749, 729, 816, 817

[56] References Cited

U.S. PATENT DOCUMENTS 602,921  4/1898  Steinmetz ............................ 318/729
4,642,545  2/1987  Lewus .................................. 318/749

FOREIGN PATENT DOCUMENTS 319684  5/1930  United Kingdom ................ 318/749

Primary Examiner—David Smith, Jr.
Attorney, Agent, or Firm—Jones, Askew & Lunsford

[57] ABSTRACT

An apparatus for starting and running a plurality of three-phase motors from a single-phase power source is described. Two of the main coils of a three-phase motor are used to run the motor as a single-phase induction motor. The third coil of a three-phase motor is used as a starting coil and is selectively powered through a switch and a capacitor. The capacitor provides the necessary difference in the phase angle of the current in the starting coil and the main coils to provide starting torque for the operation of the motor.

5 Claims, 1 Drawing Sheet

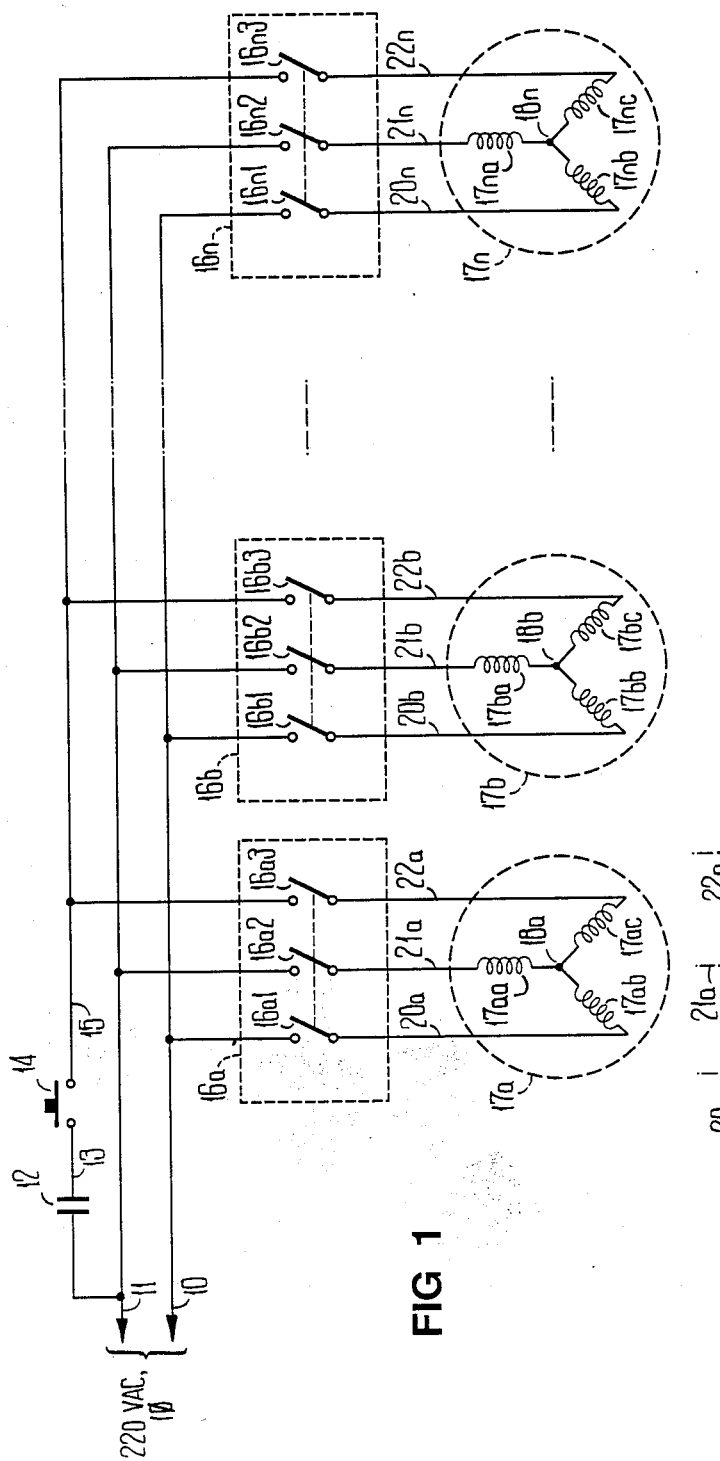
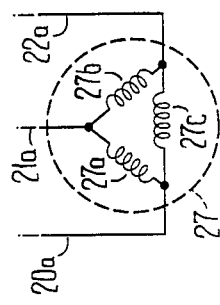
FIG 1
FIG 2

APPARATUS FOR STARTING AND RUNNING A PLURALITY OF THREE-PHASE MOTORS FROM A SINGLE-PHASE POWER SOURCE

TECHNICAL FIELD

The present invention relates to electric motors and particularly discloses an apparatus for starting and running several three-phase motors from a single-phase power source.

BACKGROUND

Most commercially-available electrical power can be characterized as either single-phase or three-phase. Both single-phase and three-phase power are generally available in industrial areas, but in rural areas and in many residential areas only single-phase power is generally available. Most industries which are connected to a three-phase source of power use three-phase motors. Therefore, as these industries upgrade or replace their equipment, used three-phase motors become available on the surplus market at a price substantially lower than that for a new three-phase motor or a new single-phase motor. However, these surplus three-phase motors are not useful to many potential users because of the cost of obtaining three-phase power and the cost of single-phase/three-phase converters.

Therefore, there is a need for a system which allows three-phase motors to be started and run from a single-phase power line.

SUMMARY OF THE INVENTION

The present invention provides an economical apparatus for starting and running one or more three-phase motors from a single-phase power line.

It is well know that a true single-phase induction motor, that is, one which contains only a single stator coil, has no starting torque, but will run in either direction of rotation once it has been started by an external force. Therefore, most single-phase motors are not true single-phase motors but are modified single-phase motors. Most modified single-phase motors fall into one of two categories: those with shading coils, and those with a starting coil. Shading coils are generally used only on small size motors.

Motors using starting coils are generally constructed such that the starting coil is wound with the magnetic access displaced 90° from that of the main (running) coil. The starting coil is also excited from the single-phase power source but, in order to produce the rotating magnetic field necessary to start the induction motor, the phase angle of the current in the starting coil is different from that of the phase angle of the current in the main winding. The difference in phase angle of the current of the starting coil is frequently accomplished by either a different inductance/resistance ratio in the starter coil as compared to the main coil, or by placing a capacitor in series with the starter coil. The net result is that the magnetic field in the motor rotates and starts the rotor to turning. Generally, the starting coil is disconnected by centrifugal switch once the motor reaches a predetermined speed.

Three-phase motors do not require shading coils or a starting coil because the three-phase power source and the three main windings produce the required rotating magnetic field. As is well known, the direction of rotation can be reversed by simply reversing the connections to any two of the three main coils. However, when a three-phase motor is connected to a single-phase power source, the three-phase motor acts as a true single-phase motor in that it has no starting torque but will run in either direction once started.

Since three-phase motors have three windings, the present invention uses two of the windings for the main windings, and uses the third main winding as the starting coil. However, as is necessary with the starting coil of a single-phase motor, this starting coil must have a phase angle of its current which is different than the phase angle of the current in the main windings. Therefore, a capacitor is used to provide a different phase current for the starting coil. This produces a rotating magnetic field which causes the motor to rotate.

Therefore, it is an object of the present invention to provide a means whereby a three-phase motor may be started and run from a single-phase power source.

It is a further object of the invention to provide a means whereby a plurality of three-phase motors may be started and run from a single-phase power source.

These and other objects of the present invention will become apparent from the detailed description below.

BRIEF DESCRIPTION OF THE DRAWING

FIG. 1 is a schematic diagram of the preferred embodiment of the present invention in its preferred environment.

FIG. 2 is a schematic diagram showing the connection to a delta-type motor.

DETAILED DESCRIPTION

Turn now to the drawings in which like numerals represent like components throughout the several figures. FIG. 1 is a schematic diagram of the preferred embodiment of the present invention in its preferred environment.

In the preferred embodiment, conductors 10 and 11 are connected to single-phase, 220 VAC commercially available power. Switches 16a to 16b, through 16n are three-pole, single-throw switches having voltage and current ratings appropriate for the size motor 17 connected to that particular switch. The three segments of switch 16a are designated 16a1, 16a2, and 16a3. The three segments of switches 16b through 16n are similarly designated. Motor 17a through 17n are three-phase induction motors. Each motor 17 has three main windings. For example, the windings in motor 17a are designated as 17aa, 17ab, and 17ac. This designation is also true for motors 17b through 17n. Motor 17a is shown as a Y-type three-phase motor. Therefore, one end of coil 17aa, 17ab, and 17ac are connected together at node 18a. In some motors 17, node 18 is brought out as a separate lead, but this separate lead is not used in the preferred embodiment.

Conductor 10 is connected to one terminal of switch sections 16a1, 16b1, . . . 16n1. Conductor 11 is connected to one terminal of capacitor 12 and one terminal of switch sections 16a2, 16b2, . . . 16n2. In the preferred embodiment, capacitor 12 has a value of 900 microfarads. The other end of capacitor 12 is connected by conductor 13 to one terminal of a single-pole, single-throw switch 14. In the preferred embodiment, switch 14 is a push button or momentary switch. The other terminal of switch 14 is connected by conductor 15 to one terminal of switch sections 16a3, 16b3, . . . 16n3. The other terminal of switch sections 16a1, 16b2, and 16a3 are connected by conductors 20a, 21a, and 22a, respectively, to main coils 17ab, 17aa, and 17ac, respectively, of motor 17a. The other terminals of the sections of switches 16b through 16n are similarly connected by conductors 20b through 22n to motor 17b through 17n.

Assume first that switch 14 and switches 16b through 16n are open, and that switch 16a is closed. Motor 17a will have 220 volt, single-phase power across coils 17aa and 17ab. Therefore, coils 17aa and 17ab are connected in series to form a true single-phase induction motor. Therefore, motor 17a will have no starting torque but will run in either direction once started. Assume now that switch 14 is depressed. Coil 17ac will be connected to conductor 11 through capacitor 12. Capacitor 12 will therefore provide a phase shift such that the current through coil 17ac has a different phase angle than the current through coils 17aa and 17ab. Therefore, the magnetic field in motor 17a will be rotating and provide a starting torque to motor 17a.

Once motor 17a has reached a satisfactory speed then switch 14 is opened thereby disconnecting coil 17ac. Therefore, coil 17ac, originally intended to be a main coil for a three-phase induction motor, is being used as a starting coil to start motor 17a using single-phase power. Starting coil 17ac is not required once motor 17a has begun rotation and therefore, after motor 17a has reached the desired speed, switch 14 is released and coil 17ac becomes unpowered.

Assume now that it is desired to start motor 17b. Switch 16b will closed, and switch 14 will be pressed again. Motor 17b will now receive starting torque in the same manner as motor 17a received starting torque and begin to turn. Once motor 17b has reached the desired speed, then switch 14 is again released. Therefore, a plurality of motors 17 can be sequentially started by closing the respective switch 16, for example 16a, pressing switch 14 to start motor 17a, releasing switch 14, closing the next desired switch, for example 16n, pressing switch 14 to start motor 17n, releasing switch 14, and so on. Note that each time switch 14 is closed, it provides power to the starting coil of both the motor 17 to be started and any motors 17 which are already running. However, this has not caused any problems in operation. Therefore, a single switch 14 and a single capacitor 12 are used to start and run a plurality of three-phase induction motors 17a through 17n from a single-phase power source. The present invention therefore eliminates the need for a single-phase to three-phase converter and also eliminates the need for the centrifugal switch typically used to disconnect the starter coil in modified single-phase induction motors.

Although motors 17a through 17n have been described as Y-type three-phase induction motors, it will be appreciated that the present invention is also useful with delta-type three-phase induction motors. A delta-type motor 27 is shown in FIG. 2. Motor 27 also has three main coils, 27a, 27b, and 27c. If a delta-type motor 27 is used, then conductor 20a is connected to one end of coils 27a and 27c, conductor 20b is connected to one end of coil 27b and the other end of coil 27a, and conductor 20c is connected to the other end of coils 27b and 27c. The theory and method of starting and running a delta-type motor 27 is the same as that for a Y-type motor 17.

The particular winding 17a, 17b, 17c used for the starting winding is not critical, and the direction of rotation can be reversed by reversing the connection to any two of the three windings 17a, 17b, 17c. This can be conveniently performed by a switch (not shown) which reverses the connection between, for example, conductor 20a and 20b and windings 17aa and 17ab. The above is also true for delta-type motor 27.

While the present invention has been described in detail with particular reference to the preferred embodiment thereof, it will be understood that variations and modifications can be affected within the spirit and scope of the present invention. Therefore, the scope of the present invention is to be limited only by the claims below.

I claim:

1. Apparatus for starting and running a plurality of three-phase motors from a single-phase power source, each said motor having at least three terminals, said single-phase power source providing a predetermined voltage between a first conductor and a second conductor, comprising:

phase shifting means connected to said first conductor for providing a phase-shifted voltage;

first switching means connected to said phase shifting means for selectively applying said phase-shifted voltage to a third conductor; and a plurality of second switching means, each said second switching means being connected between said first, second, and third conductors, and a particular one of said motors for selectively connecting said first, second, and third conductors to said first, second, and third terminals, respectively, of said particular one of said motors;

wherein said first switching means applies said phase-shifted voltage to said third conductor during starting of each of said three-phase motors.

2. The apparatus of claim 1, wherein said phase shifting means comprises a capacitor.

3. The apparatus of claim 1, wherein said first switching means is a momentary switch.

4. The appartus of claim 1, wherein said first switching means is a push button switch.

5. The apparatus of claim 1, wherein each of said second switching means comprises a three-pole switch.

* * * * *